(12) United States Patent
Wu

(10) Patent No.: US 11,134,531 B2
(45) Date of Patent: Sep. 28, 2021

(54) DEVICE AND METHOD OF HANDLING A DUAL CONNECTIVITY

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/970,860

(22) Filed: May 3, 2018

(65) Prior Publication Data

US 2018/0324883 A1    Nov. 8, 2018

Related U.S. Application Data

(60) Provisional application No. 62/501,760, filed on May 5, 2017.

(51) Int. Cl.
    *H04W 76/15*    (2018.01)
    *H04W 84/04*    (2009.01)
    *H04W 88/08*    (2009.01)

(52) U.S. Cl.
    CPC .......... *H04W 76/15* (2018.02); *H04W 84/042* (2013.01); *H04W 88/08* (2013.01)

(58) Field of Classification Search
    CPC . H04W 36/0069; H04W 76/15; H04W 76/27; H04W 84/042; H04W 88/06; H04W 88/08
    See application file for complete search history.

(56) References Cited

U.S. PATENT DOCUMENTS

| 9,313,802 | B2 * | 4/2016 | Heo | H04W 76/28 |
| 9,942,914 | B2 * | 4/2018 | Heo | H04L 5/1469 |
| 10,045,360 | B2 * | 8/2018 | Sang | H04W 76/15 |
| 10,141,983 | B2 * | 11/2018 | Kim | H04B 7/024 |
| 10,251,082 | B2 * | 4/2019 | Gu | H04W 24/10 |

(Continued)

FOREIGN PATENT DOCUMENTS

| CN | 104185227 A | 12/2014 | |
| CN | 109314966 A * | 2/2019 | H04W 76/16 |

(Continued)

OTHER PUBLICATIONS

Search Report dated Sep. 14, 2018 for EP application No. 18170861.1, pp. 1-5.

(Continued)

*Primary Examiner* — Eric Nowlin

(74) *Attorney, Agent, or Firm* — Winston Hsu

(57) ABSTRACT

A first base station (BS) of a first network for handling a dual connectivity (DC) comprises a storage device and a processing circuit, coupled to the storage device. The storage device stores, and the processing circuit is configured to execute instructions of: transmitting a Secondary Node (SN) Request message comprising a protocol data unit (PDU) Session identity of a communication device, to a second BS of a second network; receiving a SN Request Acknowledge message comprising a first radio resource control (RRC) message, from the second BS, in response to the SN Request message; and transmitting the first RRC message to the communication device, wherein the first RRC message configures a data radio bearer (DRB), a DRB identity and the PDU Session identity of the communication device to communicate with the second BS.

15 Claims, 4 Drawing Sheets

(56) References Cited

U.S. PATENT DOCUMENTS

| | | | |
|---|---|---|---|
| 2014/0307872 A1* | 10/2014 | Heo | H04L 5/14 380/270 |
| 2015/0223282 A1 | 8/2015 | Vajapeyam | |
| 2015/0327107 A1* | 11/2015 | Kim | H04B 7/024 370/252 |
| 2015/0358866 A1* | 12/2015 | Xu | H04W 36/38 370/331 |
| 2016/0198343 A1* | 7/2016 | Heo | H04L 43/08 380/270 |
| 2017/0303286 A1* | 10/2017 | Sang | H04W 76/15 |
| 2018/0020418 A1* | 1/2018 | Chandramouli | H04W 60/005 |
| 2018/0124726 A1* | 5/2018 | Zhang | H04W 56/0005 |
| 2018/0324624 A1* | 11/2018 | Gu | H04W 24/10 |
| 2018/0343662 A1* | 11/2018 | Sang | H04W 76/15 |
| 2018/0343697 A1* | 11/2018 | Hsu | H04W 76/16 |
| 2019/0097690 A1* | 3/2019 | Kim | H04B 7/024 |
| 2019/0098681 A1* | 3/2019 | Kwok | H04W 76/15 |
| 2019/0166646 A1* | 5/2019 | Shih | H04W 76/27 |
| 2019/0320476 A1* | 10/2019 | Wang | H04W 28/0268 |
| 2019/0327642 A1* | 10/2019 | Peng | H04W 28/0236 |
| 2021/0100061 A1* | 4/2021 | Park | H04W 28/0268 |

FOREIGN PATENT DOCUMENTS

| | | | | |
|---|---|---|---|---|
| EP | 2 836 047 A1 | | 2/2015 | |
| EP | 3254530 A1 * | | 12/2017 | H04W 60/005 |
| EP | 3 516 922 A1 | | 7/2019 | |
| WO | 2015/108291 A1 | | 7/2015 | |
| WO | 2015/118405 A2 | | 8/2015 | |
| WO | WO-2016126238 A1 * | | 8/2016 | H04W 60/005 |
| WO | WO-2018085661 A2 * | | 5/2018 | H04W 56/0005 |
| WO | WO-2018085661 A3 * | | 6/2018 | H04W 56/0005 |
| WO | WO-2018214981 A1 * | | 11/2018 | H04W 76/16 |

OTHER PUBLICATIONS

Huawei, "New IEs design for Option 7/7a/7x", 3GPP TSG-RAN WG3 #95bis, R3-171236, Apr. 3-7, 2017, Spokane, Washington, USA, XP051245946, pp. 1-4.

3GPP TS 36.300 V14.1.0 (Dec. 2016).

3GPP TS 36.300 V14.2.0 (Mar. 2017).

Notice of Allowance dated Jul. 19, 2019 for the Taiwan application No. 107115237, filing date May 4, 2018, pp. 1-4.

Office action dated Oct. 18, 2019 for EP application No. 18170861.1, pp. 1-5.

Office action dated Jan. 10, 2020 for the China application No. 201810421597.5, filing date May 4, 2018, p. 1-8.

* cited by examiner ns of HANDLING A
DUAL CONNECTIVITY

CROSS REFERENCE TO RELATED APPLICATIONS

This application claims the benefits of U.S. Provisional Applications No. 62/501,760 filed on May 5, 2017, which is incorporated herein by reference.

BACKGROUND OF THE INVENTION

1. Field of the Invention

The present invention relates to a device and a method used in a wireless communication system, and more particularly, to a device and a method of handling a dual connectivity.

2. Description of the Prior Art

3rd Generation Partnership Project (3GPP) recently starts developing dual connectivity (DC) of a long-term evolution (LTE) system and a new radio (NR) system and DC in the NR system. How to enable the DC is an important issue.

SUMMARY OF THE INVENTION

The present invention therefore provides a method and related communication device for handling a dual connectivity to solve the abovementioned problem.

A first base station (BS) of a first network for handling a dual connectivity (DC) comprises a storage device and a processing circuit, coupled to the storage device. The storage device stores, and the processing circuit is configured to execute instructions of: transmitting a Secondary Node (SN) Request message comprising a protocol data unit (PDU) Session identity of a communication device, to a second BS of a second network; receiving a SN Request Acknowledge message comprising a first radio resource control (RRC) message, from the second BS, in response to the SN Request message; and transmitting the first RRC message to the communication device, wherein the first RRC message configures a data radio bearer (DRB), a DRB identity and the PDU Session identity of the communication device to communicate with the second BS.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
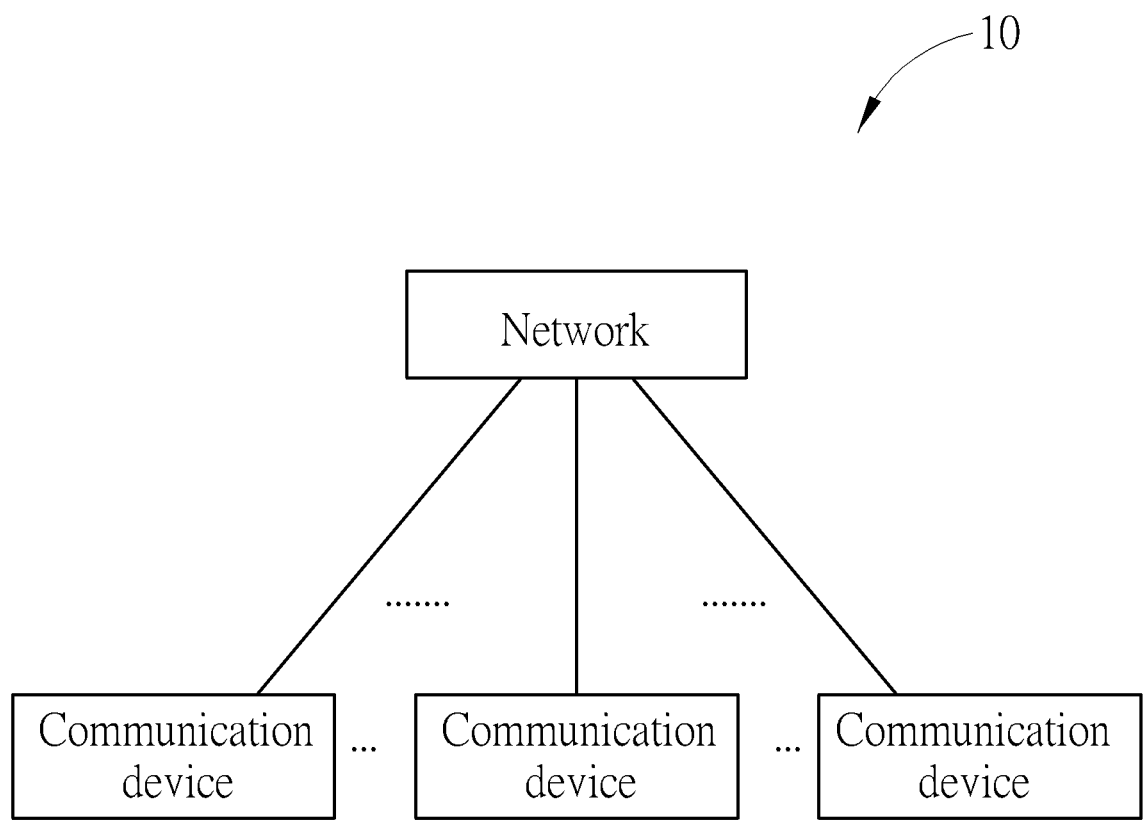
FIG. 1 is a schematic diagram of a wireless communication system according to an example of the present invention.

In FIG. 1, the wireless communication system 10 is briefly composed of a network and a plurality of communication devices. The network and a communication device may communicate with each other via one or more carriers of licensed band (s) and/or unlicensed band (s). The network and the communication device may simultaneously communicate with each other via one or multiple cells belonging to one or multiple base stations (BSs).

Practically, the network includes at least one of a long-term evolution (LTE) network and a new radio (NR)/next generation (NextGen) network. The LTE network may include an evolved universal terrestrial radio access network (E-UTRAN) and an Evolved Packet Core (EPC). The E-UTRAN includes at least one eNB connecting to the EPC. The NR/NextGen network includes a NG (or called NR) radio access network (NG-RAN) and a NextGen Core (NGC) (or called fifth generation core (5GC)). The NG-RAN includes at least one gNB (or 5G BS) connecting to the NGC. An evolved LTE (eLTE) eNB is an evolution of an eNB that supports connectivity to the NGC. In this case, the eLTE eNB may be considered in the LTE network or the NR/NextGen network.

In FIG. 1, the communication device may be configured to connect to an eNB and a gNB according to a dual connectivity (DC). That is, the communication device may perform a transmission/reception via both the eNB and the gNB. One of the eNB and the gNB may be a master BS (MBS) and the other one may be a secondary BS (SBS).

Technical terms related to the examples in the present invention are explained as follows to simplify description of successive examples. A communication device in RRC_CONNECTED may be configured with a master cell group (MCG) for communicating with a MBS and a secondary cell group (SCG) for communicating with a SBS, i.e., in DC with the MBS and the SBS. The MBS may be a master eNB (MeNB) or a master gNB (MgNB). The SBS may be a secondary eNB (SeNB) or a secondary gNB (SgNB). The MCG may include a primary cell (PCell) and zero, one or more secondary cell (SCell). The SCG may include a primary SCell (PSCell) and zero, one or more SCell. A MCG bearer may be a radio bearer whose radio protocols are only located in a MBS to use MBS resources only. A SCG bearer may be a radio bearer whose radio protocols are only located in a SBS to use SBS resources. A split bearer may be a bearer whose radio protocols are located in both the MBS and the SBS to use both MBS and SBS resources.

A communication device may be a user equipment (UE), a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for a UL, the communication device is the transmitter and the network is the receiver, and for a DL, the network is the transmitter and the communication device is the receiver.

Figure 2:
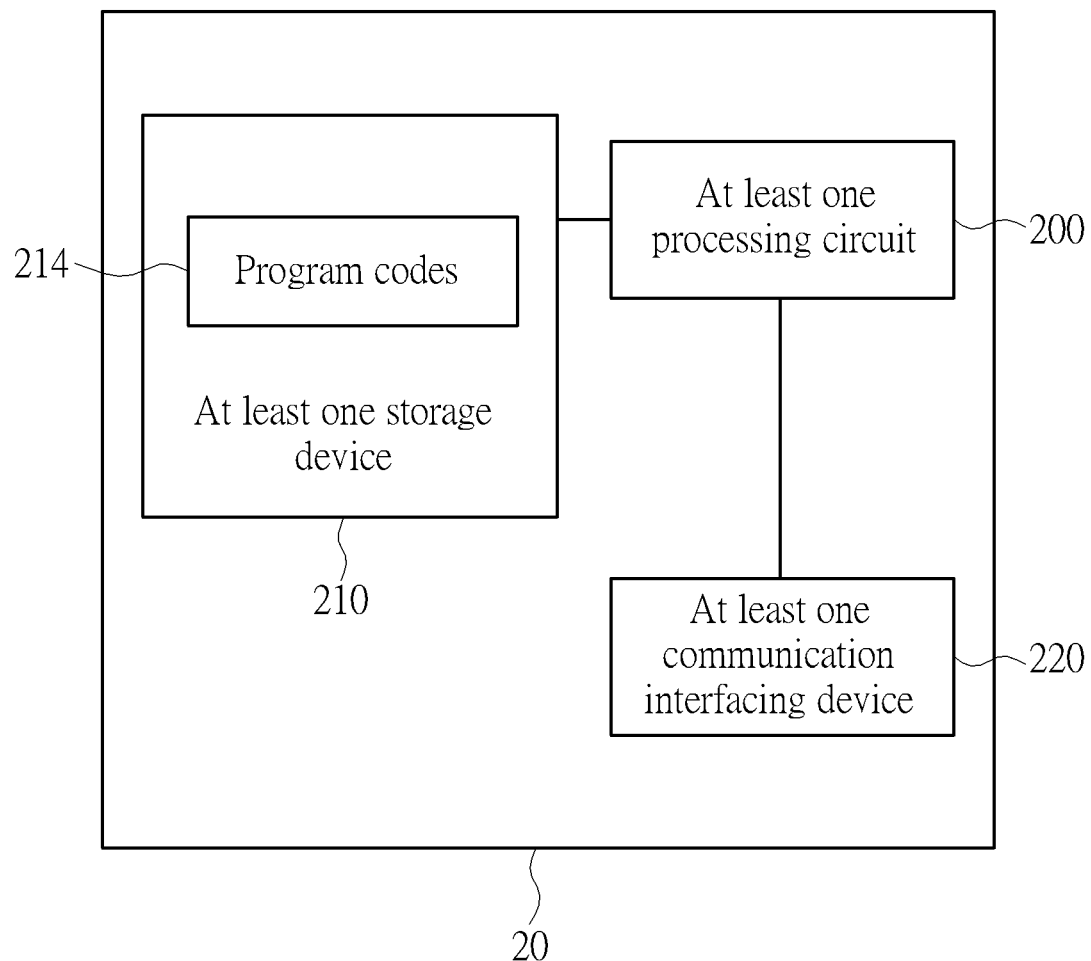
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

In the following examples, a UE is used to represent a communication device in FIG. 1, to simplify the illustration of the embodiments.

Figure 3:
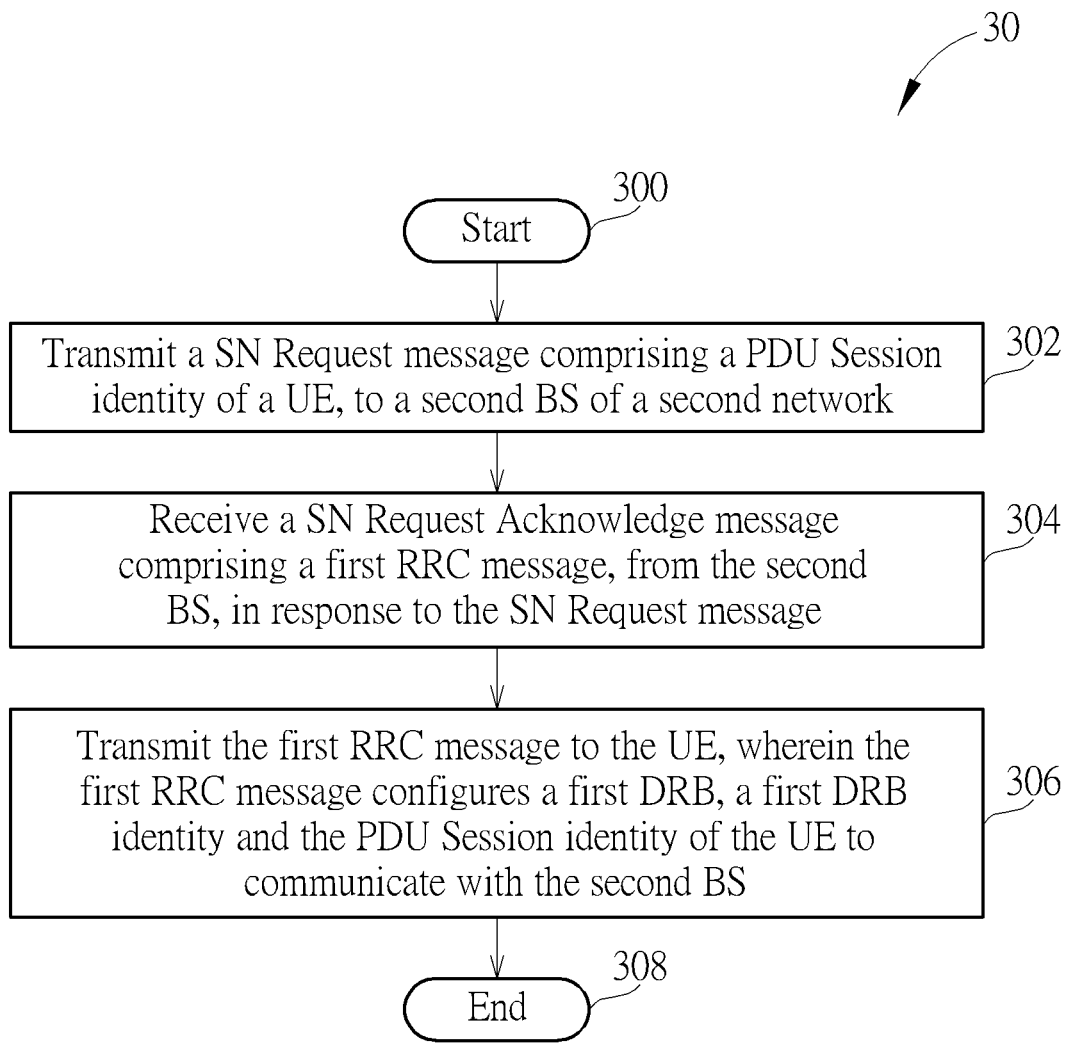
FIG. 3 is a flowchart of a process according to an example of the present invention.

A process 30 in FIG. 3 is utilized in a first BS of a first network, and includes the following steps:

Step 300: Start.

Step 302: Transmit a Secondary Node (SN) Request message comprising a PDU Session identity of a UE, to a second BS of a second network.

Step 304: Receive a SN Request Acknowledge message comprising a first radio resource control (RRC) message, from the second BS, in response to the SN Request message.

Step 306: Transmit the first RRC message to the UE, wherein the first RRC message configures a first data radio bearer (DRB), a first DRB identity and the PDU Session identity of the UE to communicate with the second BS.

Step 308: End.

According to the process 30, the second BS configures the first DRB, the first DRB identity and the PDU Session identity in the first RRC message. Thus, the UE knows that the first DRB is associated to a PDU Session identified by the PDU Session identity according to the first RRC message.

In one example, the first BS determines the PDU Session identity by setting the PDU Session identity to a first evolved packet system (EPS) bearer identity. In one example, the first BS determines the PDU Session identity by deriving the PDU Session identity from the first EPS bearer identity. In one example, the first BS may receive the PDU Session identity from a core network (CN).

In one example, the first RRC message comprises (includes) a DRB configuration configuring the first DRB. The DRB configuration comprises the first DRB identity and/or the PDU Session identity. The DRB configuration may comprise a packet data convergence protocol configuration.

In one example, the SN Request Acknowledge message may comprise the PDU Session identity and the first DRB identity. The first BS generates the first RRC message in response to/according to the SN Request Acknowledge message.

In one example, the second BS generates the first RRC message in response to/according to the SN Request message. In one example, the first DRB identity (e.g., value) is comprised in the SN Request message. In one example, the first DRB identity (e.g., value) is determined by the second BS. The SN Request message may or may not comprise a second DRB identity for the UE to communicate with the first BS. The second BS may determine (e.g., select) the first DRB identity (e.g., value) different from the second DRB identity (e.g., value), if the second DRB identity is comprised in the SN Request message. The second DRB identity may or may not associate to the PDU Session identity.

In one example, the first BS is a MBS of the UE, and the second BS is a SBS of the UE. In one example, the first network is an E-UTRAN, and the second network is a NG-RAN. In one example, the first BS may be a gNB, an eLTE eNB, an evolved gNB (e-gNB) or a sixth generation (6G) BS. The second BS may be a gNB, an eLTE eNB, an e-gNB or a 6G BS. The CN may be a 5GC, an evolved 5GC or a 6G Core, and comprises a CN node connecting to the first BS. In one example, the CN node may be an access and mobility management function (AMF).

In one example, the UE may not establish the PDU Session identified by the PDU Session identity using a PDU Session establishment procedure with the first network. In the PDU Session establishment procedure, the UE transmits a non-access-stratum (NAS) message (e.g., an Activate PDU Session Request message) to the CN via the first network (e.g., the first BS) and receives a NAS response message (e.g. Activate PDU Session Accept message) from the CN via the first network (e.g., the first BS). The NAS message and/or the NAS response message may comprise the PDU Session identity. The NAS message and/or the NAS response message may comprise a PDU Type, a Session and Service Continuity (SSC) mode or Protocol Configuration Options.

In one example, the UE has a RRC connection (e.g., a signaling radio bearer) with the first BS. The UE receives the first RRC message from the first BS via the RRC connection and connects to the second BS according to configurations in the first RRC message. The UE keeps connecting to the first BS when/while connecting to the second BS. The UE communicates (e.g., transmits/receives) control signals (e.g., acknowledgement, negative acknowledgement, and/or channel state information) and data (e.g., PDUs) of the PDU Session on the first DRB with (i.e., to/from) the second BS, while having the RRC connection with the first BS, i.e., has a DC with (i.e., simultaneously connect to) the first BS and the second BS. The configurations include physical layer configuration (e.g., physical channel configuration), medium access control configuration, and/or radio link control configuration.

In one example, the second BS transmits the first RRC message to the first BS and the first BS transmits a second RRC message comprising the first RRC message to the UE. The first BS receives a second RRC response message responding the second RRC message, from the UE.

In one example, the first RRC message is a NR RRC message. The second RRC message is a LTE RRC message and the second RRC response message is a LTE RRC response message. In one example, the LTE RRC message is a LTE RRC Connection Reconfiguration message, and the LTE RRC response message is a LTE RRC Connection Reconfiguration Complete message. For example, the LTE RRC message and the LTE RRC response message are newly defined (e.g., in the 3GPP standard) RRC messages.

In one example, the first RRC message is a LTE RRC message. The second RRC message is a NR RRC message and the second RRC response message is a NR RRC response message. In one example, the NR RRC message is a NR RRC Reconfiguration message, and the NR RRC response message is a NR RRC Reconfiguration Complete message.

In one example, the first DRB is a SCG split bearer or a SCG bearer. In one example, the UE may or may not transmit a first RRC response message to the first BS. The first BS transmits the first RRC response message to the second BS if the UE transmits the first RRC response message. The second RRC response message may comprise the first RRC response message. The first RRC response message may be a NR RRC response message. The LTE RRC response message may include the first RRC response message. For example, the first RRC message is a NR RRC Reconfiguration message, and the first RRC response message is a NR RRC Reconfiguration Complete message.

Figure 4:
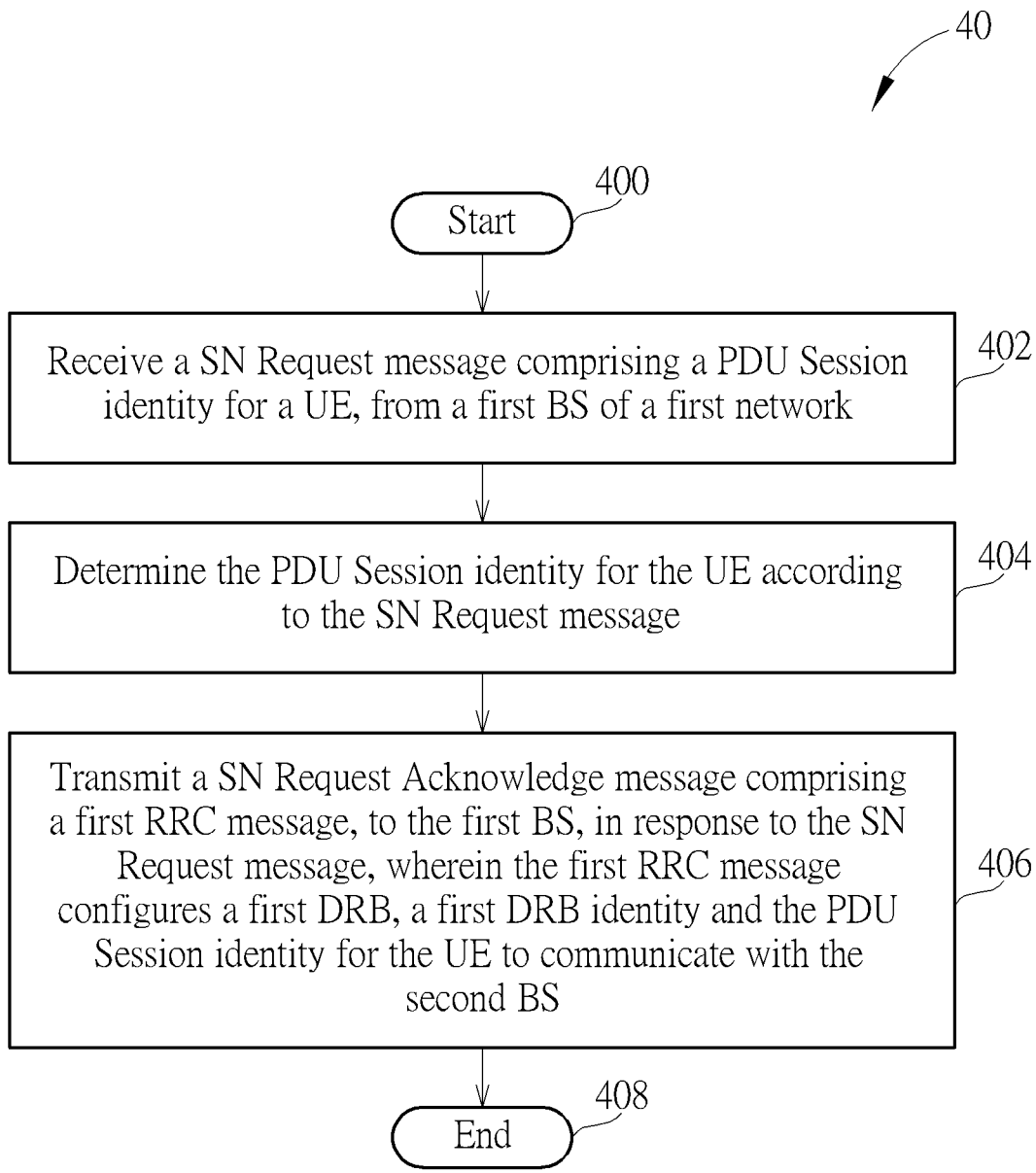
FIG. 4 is a flowchart of a process according to an example of the present invention.

Operations of the second BS in the process 30 may be summarized to a process 40 in FIG. 4. The process 40 is utilized in a second BS of a second network, and includes the following steps:

Step 400: Start.

Step 402: Receive a SN Request message comprising a PDU Session identity for a UE, from a first BS of a first network.

Step 404: Determine the PDU Session identity for the UE according to the SN Request message.

Step 406: Transmit a SN Request Acknowledge message comprising a first RRC message, to the first BS, in response to the SN Request message, wherein the first RRC message configures a first DRB, a first DRB identity and the PDU Session identity for the UE to communicate with the second BS.

Step 408: End.

In one example, the second BS generates the first RRC message and comprises the PDU Session identity in the first RRC message, when the second BS receives the SN Request message. In one example, the first DRB identity (e.g., value) is comprised in the SN Request message. In one example, the first DRB identity (e.g., value) is determined by the second BS. The SN Request message may or may not include a second DRB identity for the UE to communicate with the first BS. The second BS may determine (e.g., select) the first DRB identity (e.g., value) different from the second DRB identity (e.g., value), if the second DRB identity is comprised in the SN Request message.

Examples and description of the process 30 may be applied to the process 40, and are not repeated herein. The following examples may be applied to the processes above.

The SN Request message and the SN Request Acknowledge message may be Xn interface messages. For example, the SN Request message is a SN Addition Request message, a SN Modification Request message, a SgNB Addition Request message or a SgNB Modification Request message. For example, the SN Request Acknowledge message may be a SN Addition Request Acknowledge message, a SN Modification Request Acknowledge message, a SgNB Addition Request Acknowledge message, or a SgNB Modification Request Acknowledge message.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. For example, the skilled person easily makes new embodiments of the network based on the embodiments and examples of the UE or the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for solving the problem regarding communication between the UE, the LTE system and the NR system in the DC. Thus, the UE, the LTE system and the NR system know how to communication with each other in the DC.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first base station (BS) for handling a dual connectivity (DC), comprising:
a storage device; and
a processing circuit, coupled to the storage device, wherein the storage device stores instructions, and the processing circuit is configured to execute the instructions of:
transmitting a Secondary Node (SN) Request message comprising a protocol data unit (PDU) Session identity of a user equipment (UE), to a second BS;
receiving a SN Request Acknowledge message comprising a first radio resource control (RRC) message, from the second BS, in response to the SN Request message, wherein the first RRC message includes a Data Radio Bearer (DRB) configuration configuring a DRB for the UE to communicate with the second BS, and the DRB configuration includes a DRB identity, a packet data convergence protocol configuration and the PDU Session identity; and
transmitting the first RRC message to the UE.

2. The first BS of claim 1, wherein the DRB identity is comprised in the SN Request message.

3. The first BS of claim 1, wherein the first BS is a master BS (MBS) of the UE, and the second BS is a secondary BS (SBS) of the UE.

4. The first BS of claim 1, wherein the first RRC message is a new radio (NR) RRC message.

5. The first BS of claim 1, wherein the first BS transmits the first RRC message by transmitting a second RRC message comprising the first RRC message, and the instructions further comprise:
receiving, from the UE, a second RRC response message in response to the second RRC message.

6. The first BS of claim 5, wherein the second RRC message is a LTE RRC Connection Reconfiguration message, and the second RRC response message is a LTE RRC Connection Reconfiguration Complete message.

7. The first BS of claim 1, wherein the SN Request Acknowledge message includes the PDU Session identity and the first DRB identity.

8. A second base station (BS) for handling a dual connectivity (DC), comprising:
a storage device; and
a processing circuit, coupled to the storage device, wherein the storage device stores instructions, and the processing circuit is configured to execute the instructions of:
receiving a Secondary Node (SN) Request message comprising a protocol data unit (PDU) Session identity for a user equipment (UE), from a first BS;
determining the PDU Session identity for the UE according to the SN Request message; and
transmitting a data radio bearer (DRB) configuration to the UE via the first BS, wherein the DRB configuration includes a DRB identity, a packet data convergence protocol configuration and the PDU Session identity for the UE to communicate with the second BS.

9. The second BS of claim 8, wherein the DRB identity is comprised in the SN Request message.

10. The second BS of claim 8, wherein the DRB identity is determined by the second BS.

11. A first base station (BS) for handling a dual connectivity (DC), comprising:
- a storage device; and
- a processing circuit, coupled to the storage device, wherein the storage device stores instructions, and the processing circuit is configured to execute the instructions of:
  - transmitting a Secondary Node (SN) Request message comprising a protocol data unit (PDU) Session identity of a user equipment (UE), to a second BS;
  - receiving a SN Request Acknowledge message comprising a data radio bearer (DRB) configuration from the second BS, in response to the SN Request message, wherein the DRB configuration is for the UE to communicate with the second BS and includes a DRB identity, a packet data convergence protocol configuration and the PDU Session identity; and
  - transmitting the DRB configuration to the UE.

12. The first BS of claim 11, wherein the SN Request Acknowledge message includes the PDU Session identity and the first DRB identity.

13. The first BS of claim 11, wherein the first BS is a master BS (MBS) of the UE, and the second BS is a secondary BS (SBS) of the UE.

14. The first BS of claim 11, wherein the DRB identity is determined by the second BS.

15. The first BS of claim 11, wherein transmitting the DRB configuration to the UE comprises transmitting a radio resource control (RRC) message including the DRB configuration to the UE.

\* \* \* \* \*